US008297313B1

(12) United States Patent
Taylor

(10) Patent No.: US 8,297,313 B1
(45) Date of Patent: Oct. 30, 2012

(54) PRESSURE ABATEMENT EMERGENCY SHUT DOWN ASSEMBLY WITH A COLLAPSIBLE MEMBER RETAINED VALVE MEMBER

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 849 days.

(21) Appl. No.: 12/422,656

(22) Filed: Apr. 13, 2009

Related U.S. Application Data

(60) Provisional application No. 61/158,963, filed on Mar. 10, 2009.

(51) Int. Cl.
*F16K 17/14* (2006.01)
*F16K 17/40* (2006.01)
(52) U.S. Cl. ............... 137/624.27; 137/70; 137/613
(58) Field of Classification Search ............... 137/70, 137/624.27, 613, 69, 71, 68.11
See application file for complete search history.

(56) References Cited

U.S. PATENT DOCUMENTS

| | | | | |
|---|---|---|---|---|
| 4,724,857 A | * | 2/1988 | Taylor | 137/71 |
| 5,012,834 A | * | 5/1991 | Taylor | 137/70 |
| 5,433,239 A | * | 7/1995 | Taylor | 137/69 |
| 6,155,284 A | * | 12/2000 | Scantlin | 137/70 |
| 6,799,597 B1 | * | 10/2004 | Taylor | 137/624.27 |
| 7,438,087 B1 | | 10/2008 | Taylor | |

* cited by examiner

*Primary Examiner* — Kevin Lee
(74) *Attorney, Agent, or Firm* — Hall Estill Attorneys at Law

(57) ABSTRACT

A fluid control assembly configured to isolate a pressurized fluid, including an under pressure abatement assembly having a collapsible member and an energy storage member for exerting a collapsing force on the collapsible member while contactingly engaging a pivotal valve member. A conduit path directs pressurized fluid to exert a force in opposition to the collapsing force so that when the fluid pressure falls below a low pressure threshold, the collapsing force will collapse the collapsible member and release the valve member. An over pressure abatement assembly can be included having a second collapsible member and a second valve member, a conduit path directing pressurized fluid to exert a force in a direction to collapse the second collapsible member and release the second valve member when the fluid pressure exceeds an upper pressure threshold.

20 Claims, 5 Drawing Sheets

NORMAL OPERATING PRESSURE

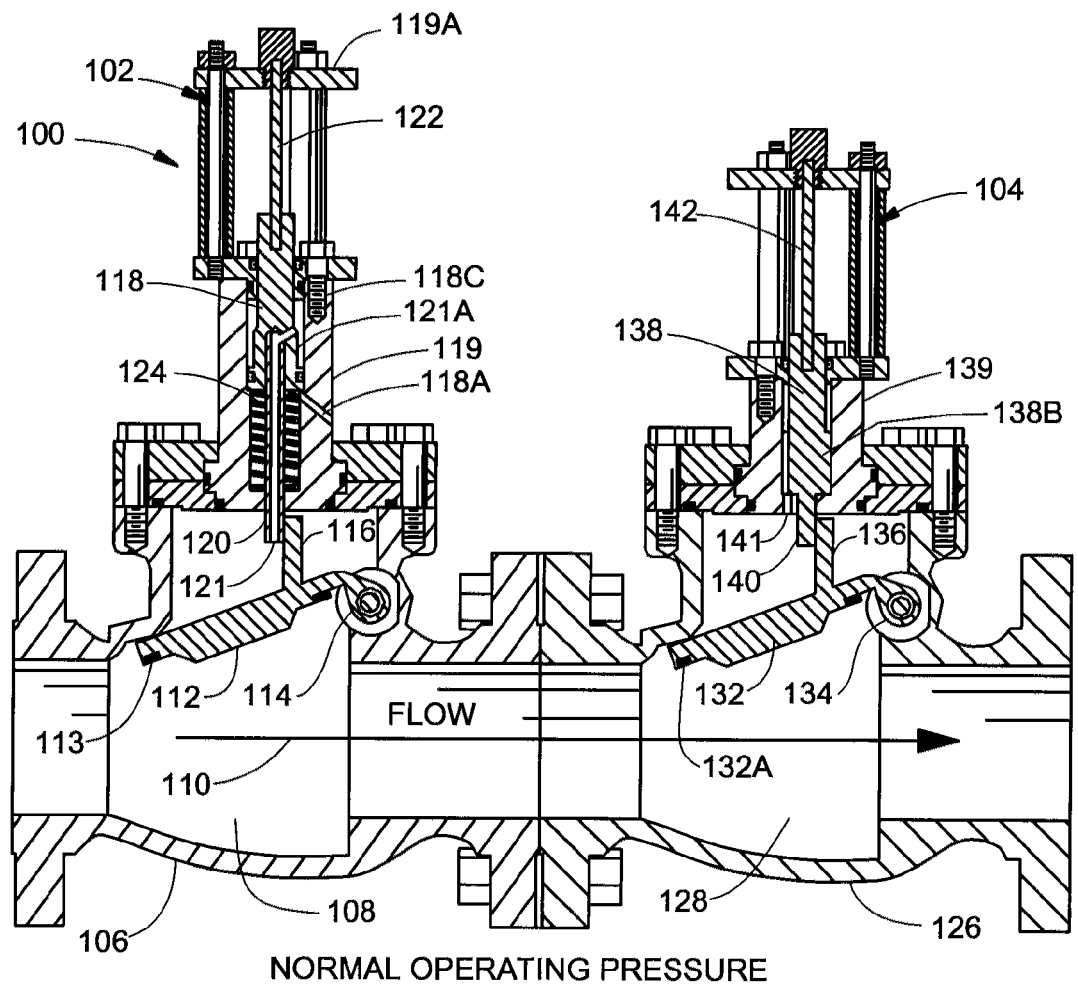
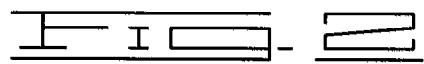

PRESSURE ABATEMENT EMERGENCY SHUT DOWN ASSEMBLY WITH A COLLAPSIBLE MEMBER RETAINED VALVE MEMBER

RELATED APPLICATIONS

This application makes a claim of domestic priority under 35 U.S.C. §119(e) to U.S. Provisional Patent Application No. 61/158,963 filed Mar. 10, 2009.

BACKGROUND

Pressurized fluid systems are often provided with emergency pressure control and relief capabilities to prevent the possibility of injury to humans and damage to equipment in the event of an over pressure situation. Such pressure control systems often use a pressure responsive member such as a buckling pin that mechanically fails when subjected to a large increase in fluid pressure, causing an axial force to buckle the pin. Failure of the pressure responsive member allows a valve assembly to operate to close so as to isolate the over pressure from downstream equipment, such as by shutting down the fluid flow.

There are also systems that operate to detect and abate underpressure conditions as a downstream line break. A rupture in a pressurized pipeline or similar network can result in a sudden drop in system pressure as the fluid escapes to the external environment. Thus it is often necessary to activate a valve assembly to isolate the fluid, such as a shutoff valve which halts further flow of the fluid, until the line break condition is remediated.

There is a continued need for improvements in the art to provide a pressure control system that operates when the pressure of a fluid falls outside a selected high or low operating range or a combination of both.

SUMMARY

An embodiment of the present invention is generally directed to an apparatus and method for a fluid control assembly that is configured to establish low pressure isolation for a pressurized fluid when the pressure thereof falls below a predetermined low pressure threshold. The fluid control assembly has an under pressure abatement assembly having a collapsible member and an energy storage member that exerts a force to mechanically collapse the collapsible member.

A conduit path directs a portion of the pressurized fluid to exert an opposing force to the spring force, wherein when the pressurized fluid exceeds the low pressure threshold, the opposing force will exceed the spring force and the collapsible member will remain uncollapsed, and wherein when the pressurized fluid falls below the low pressure threshold, the spring force will be greater than the opposing force and the collapsible member will be mechanically collapsed.

The fluid control assembly can also have an over pressure abatement assembly in fluid communication with the under pressure abatement assembly and configured for establishing high pressure isolation of the pressurized fluid when the pressure thereof exceeds a predetermined upper pressure value. The over pressure abatement assembly has a second collapsible member to isolate the pressurized fluid by exerting a collapsing force on the second collapsible member when the pressurized fluid exceeds the upper pressure value and when the pressurized fluid is below the upper pressure value, the force of the pressurized fluid will be insufficient to collapse the second collapsible member.

The advantages, objects and benefits of the present invention will be apparent from the description provided herein when read along with the accompanying drawings and appended claims.

BRIEF DESCRIPTION OF THE DRAWINGS

FIG. 2 is a cross-sectional view of the fluid control assembly of FIG. 1 that is operating under a normal operating condition.

FIG. 6 is an enlarged cross-sectional view of a portion of the high pressure abatement assembly of the fluid control assembly of FIG. 5.

DETAILED DESCRIPTION

As described herein, various embodiments of the present invention can be generally characterized as an apparatus and method for abating the pressure condition of a pressurized fluid in an under pressure condition and in an over pressure condition.

Figure 1:
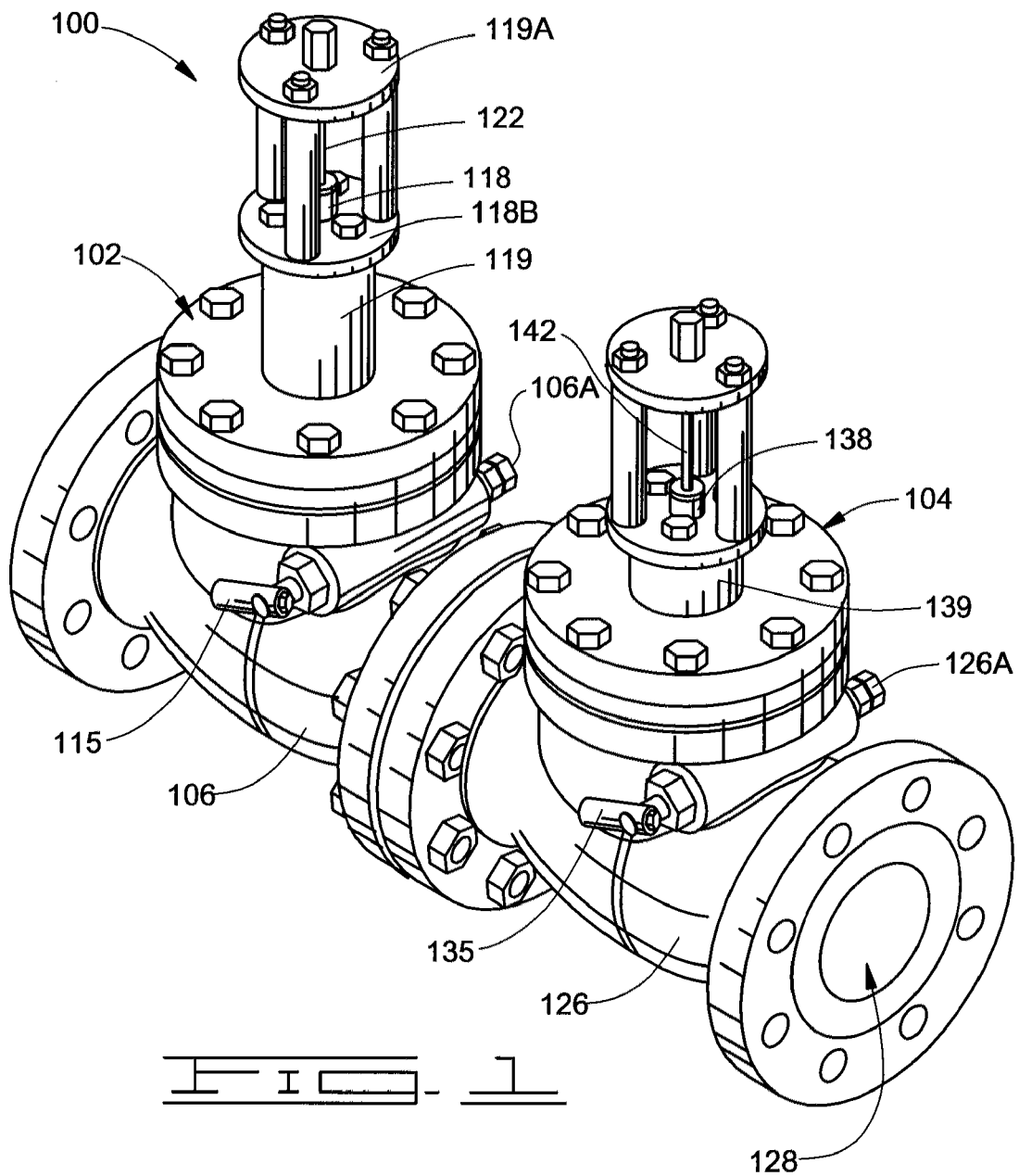
FIG. 1 is an isometric view of a fluid control assembly constructed in accordance with the present invention.

FIG. 1 shows a fluid control system 100 constructed in accordance with the present invention. The fluid control system 100 includes an under pressure abatement assembly 102 and an over pressure abatement assembly 104. As shown in FIG. 2, the under pressure abatement assembly 102 includes a housing 106 which has an interior conduit 108 for the flow of a pressurized fluid, which can be a liquid or a gas, in a flow direction 110.

The under pressure abatement assembly 102 has a pivotal first valve member 112 that is characterized as a hinged clapper valve that has a facial o-ring seal 113. It will be appreciated that other valve configurations of the valve member can be utilized as desired. Furthermore, the first valve member 112 is depicted as a normally open valve.

The first valve member 112 is pivotally supported by a hinge 114, and as depicted in FIG. 1, an external handle 115 is coupled to the valve member 112 at the hinge 114. The handle 115 is provided for manual rotation of the first valve member 112 to be employed as necessary for the purpose described hereinbelow. Returning to FIG. 2, it will be noted that a projection 116 extends from the first valve member 112 that serves to maintain the first valve member in the normally open position during normal system operation in the manner to be described.

A first piston 118 is disposed in a bore in a valve bonnet 119 that is bolted to the housing 106; the first piston 118 is supported for axial movement relative to the first valve member 112 and includes a rigid tube projection 120 that contactingly engages the projection 116 to serve as a limit stop to inhibit rotational motion of the valve member 112 in the valve open mode depicted in FIG. 2. The tube projection 120 includes a tube passageway 121 that communicates with a piston passageway 121A in the piston 118 to provide fluid flow of a portion of the pressurized fluid along conduit 108 to exert a downward force upon a shoulder portion 118B of the piston 118 (as shown in FIG. 3).

The piston 118 is coupled to a replaceable first collapsible member 122, which may be characterized as a buckling pin that resists mechanical collapse (deformation) in accordance with Euler's Law. It will be recognized by persons skilled in the art that other forms of the collapsible member can readily be utilized. A first energy storage member 124, characterized as a coiled spring, is supported in the travel cylinder below the piston 118 to exert an upwardly directed force upon the first collapsible member 122. A small pressure equalizing bore 118A communicates with the travel cylinder in vicinity of the energy storage member 124 and extends through the valve bonnet 119 to maintain the pressure about the energy storage member is that of the ambient pressure.

Figure 3:
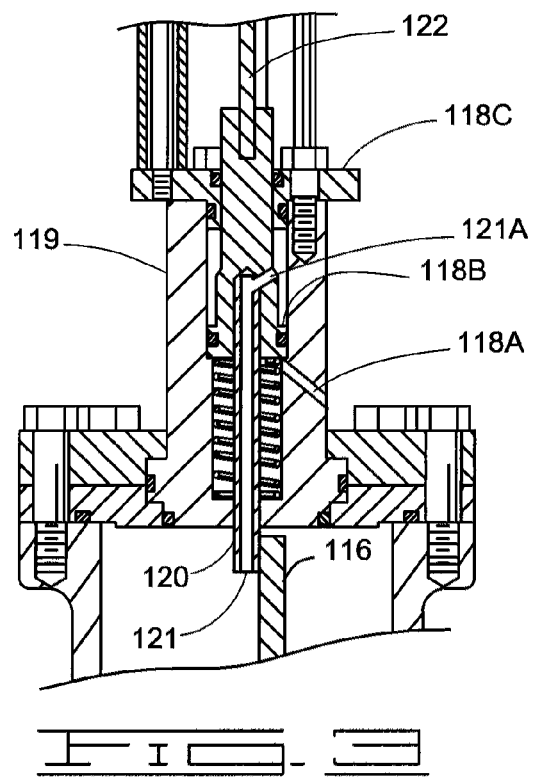
FIG. 3 is an enlarged cross-sectional view of a portion of the under pressure abatement assembly of the fluid control assembly of FIG. 1.

As shown in FIG. 3, the lower portion of the piston 118 forms the pressure shoulder 118B sealed with an o-ring seal (not separately numbered); and a ring retainer member 118C, having a central opening through which the piston 118 extends, retains the piston 118 for potential movement toward the collapsible member 122. The lower end of the collapsible member 122 is supported in a bore (not separately numbered) in the upper end of the piston 118, and the upper end of the collapsible member 122 is supported in a bore in an upper portion 119A of the valve bonnet 119. The ring retainer member 118C is bolted to the bonnet 119 as shown. Fluid communication is provided from the interior conduit 108 of the housing 106 through the passageway 121 and piston passageway 121A to the opening surrounding the piston 118 and to the pressure shoulder 118B.

During normal system operation of the under pressure abatement assembly 102, when the pressure of the pressurized fluid in the conduit 108 is above a predetermined low threshold value (such as, by way of example, below about 50 pounds per square inch or psi), the force exerted by the pressurized fluid on the pressure shoulder 118B of the first piston 118 is greater than the force exerted by the spring 124, the effect of which is that the piston 118 is in an equilibrium stationary state, and the first collapsible member 122 remains in an uncollapsed state, as depicted in FIG. 2.

Figure 4:
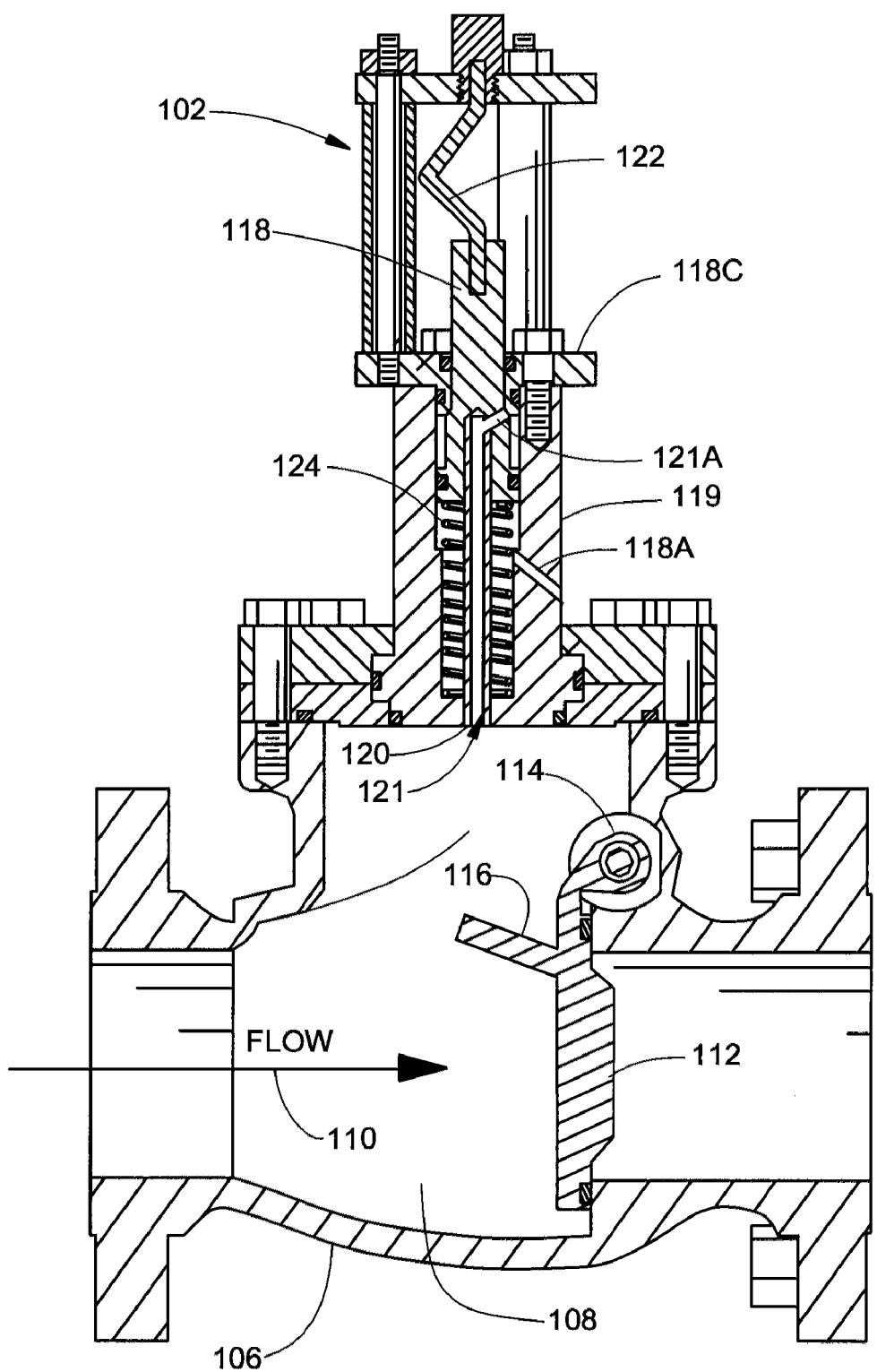
FIG. 4 is a cross-sectional view of the under pressure abatement assembly of the fluid control assembly of FIG. 1 that is operating in an under pressure operating condition.
Figure 5:
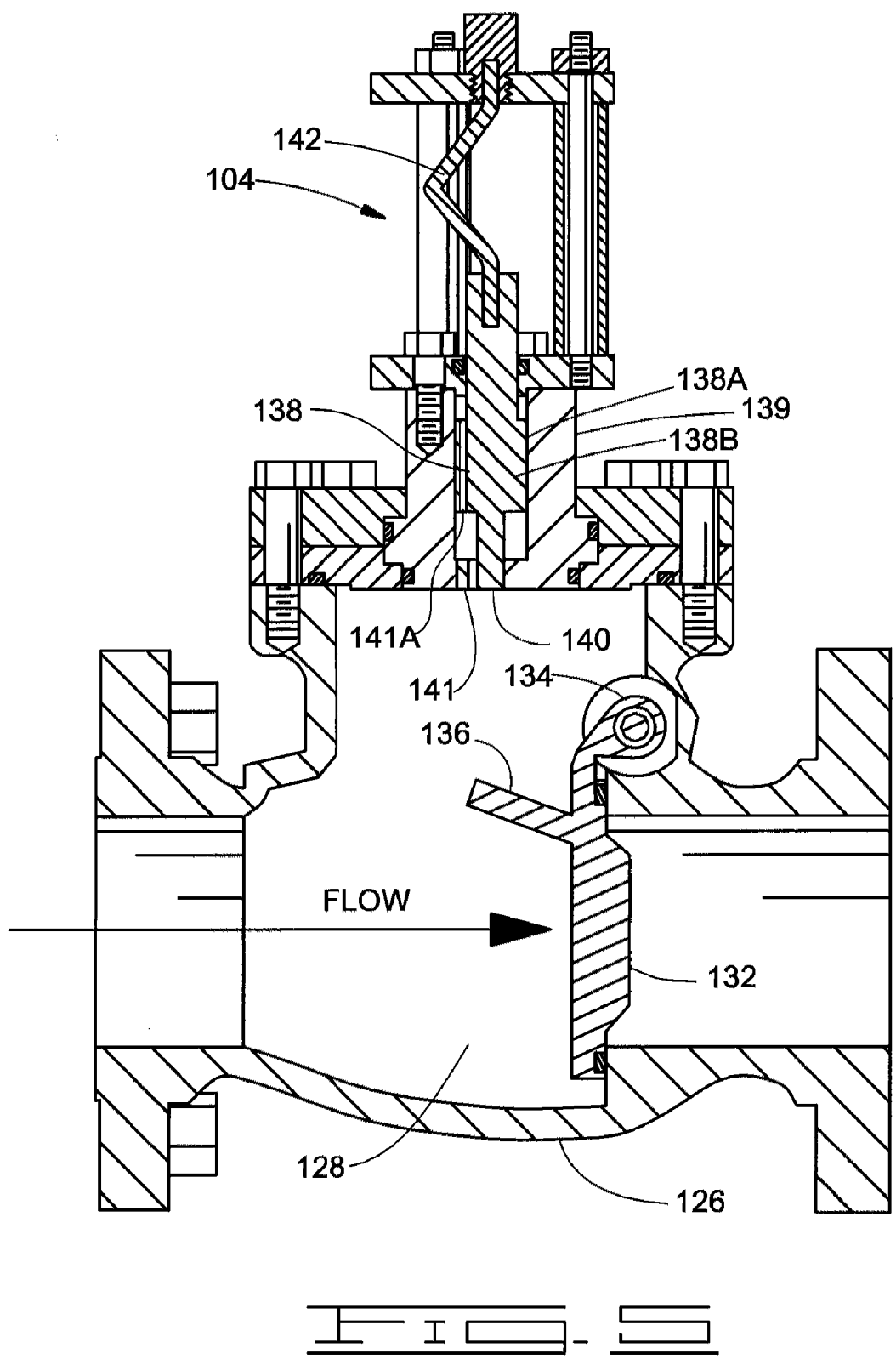

When the pressure of the fluid falls below the predetermined threshold low pressure value, the under pressure abatement assembly 102 will assume the mode illustrated in FIG. 4 to block the fluid flow. As shown in FIG. 4, the spring 124 operates to collapse the first collapsible member 122 when the pressurized fluid in the conduit 108 falls below the predetermined threshold low pressure value; that is, as the pressure in the interior passageway 121 falls below the low threshold value, the spring 124 expands to move the piston 118 upwardly, thereby withdrawing the tube projection 120 from contact with the projection 116 of the valve member 112. As this occurs, the pressurized fluid causes the first valve member 112 to rotate into seating contact with the valve seat (not numbered) thus closing the interior conduit 108 to fluid flow.

Thus, if a low pressure condition is experienced, such as a break downstream of the fluid control system 100, the under pressure abatement assembly 102 will close, isolating the upstream pressure, that is, cutting off further fluid flow. An electronic monitoring system as a proximity (not shown) can be used to send a notification signal of the closing of the assembly 102. It will be noted that the collapsible member 122 as depicted in FIG. 4 will normally be bent in three locations along an axial length thereof.

To reset the underpressure abatement assembly 102 after the low pressure condition has been rectified, while an upstream valve can be closed, the pressure can be bled from conduit 108 using a bleed off valve 106A on the housing 106 that communicates with the inner conduit 108. Once the fluid flow has been stopped and the pressure bled off, a workman can manually rotate the first valve assembly 112 back to the normally open position as shown in FIG. 2 using the handle 115 (shown in FIG. 1), and slowly open the upstream valve to initiate fluid flow through the system 100 to gradually increase the fluid pressure in the internal cavity 108 and on the piston 118.

The pressure of the fluid in the internal cavity 108, and thus in the tube passageway 121 of the tube projection 120 and the piston passageway 121A, will advance the piston 118 downwardly, overcoming the force of the spring 124 and moving the tube projection 120 into locking engagement with the projection 116. A new, replacement collapsible member 122 can then be installed and the system will be returned to the normal state as depicted in FIG. 2.

Figure 5:
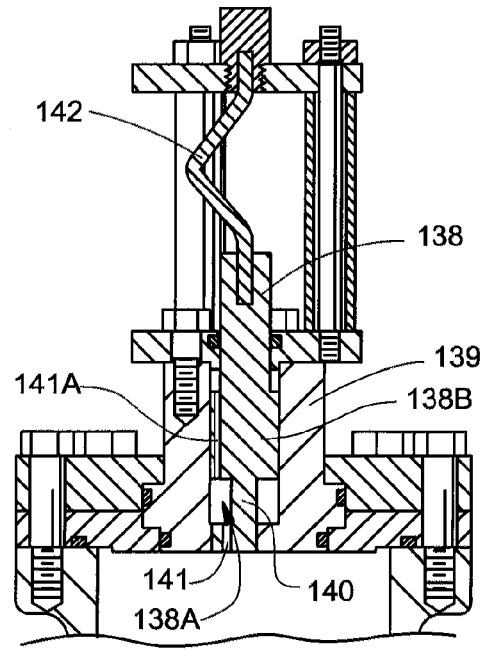
FIG. 5 is a cross-sectional view of the over pressure abatement assembly of the fluid control assembly of FIG. 1 that is operating in an over pressure condition.

Turning now to the over pressure abatement assembly 104 that is shown in FIGS. 2 and 5 (and an enlarged portion is shown in FIG. 6), this assembly includes a housing 126 that can be connected to the housing 106 of the under pressure abatement assembly 102 by means of flanges and bolts, as illustrated. The housing 126 defines an interior conduit 128 in line with the conduit 108 to facilitate passage of the fluid flow in direction 110. The over pressure abatement assembly 104 has a second valve member 132 that has an o-ring seal 132A and that is also of the normally open type. The valve member 132 is also characterized as a hinged clapper type valve, although such is not limiting. The valve member 132 rotates about a hinge pin 134, and the hinge pin 134 extends through the wall of the housing 126 to support an external handle 135 (see FIG. 1) that can be manually operated by a workman.

The valve member 132 includes a projection 136 that extends upwardly as herein described for the projection 116 of the first valve member 112. A second piston 138 is disposed in a piston bore 138A in a valve bonnet portion 139 that is bolted to the housing 126; the second piston 138 is supported for axial movement in the piston bore 138A relative to the valve member 132. The second piston 138 has a lower enlarged portion 138B that is dimensioned to be slidingly received in the piston bore 138A and that includes a downwardly extending locking pin 140 to engage against the projection 136 when the second valve member 132 is in the normally open position mode. That is, the locking pin 140 serves as a limit stop to inhibit rotational motion of the valve member 132 when in the valve open mode depicted in FIG. 2.

A portion of the fluid flow in the conduit 128 passes via a passageway 141 to exert an upwardly directed force on the second piston 138. A pressure bore 141A extends upwardly through the second piston 138 to equalize pressure above and below the lower enlarged portion 138B. A second collapsible member 142, such as a buckling pin, is coupled to, and resists the upper movement of, the piston 138.

During normal operation when the fluid pressure in the interior conduit 128 is below a predetermined upper threshold value, such as, by way of example, 1000 psi, the strength of the collapsible member 142 will be sufficient to resist the upward movement of the second piston 138. However, should the fluid pressure in the interior conduit 128, and thus in the passageway 141 and pressure bore 141A, exceeds the predetermined upper threshold value, the second piston 138 will be driven upwardly to buckle the second collapsible member 142; as the second piston 138 moves upward, the locking pin 140 is retracted to release the valve member 132, allowing the weight of the valve member 132 and the fluid pressure to rotate and seal the valve member 132 to its closed position, as depicted. The over pressure abatement assembly 104 can be constructed in accordance with the teaching set forth in U.S. Pat. No. 7,438,087 to Taylor, assigned to the assignee of the present application and hereby incorporated by reference.

To reset the over pressure abatement assembly 104 after being subjected to an over pressure condition, and thus the collapse of the second collapsible member 142, the pressure within the interior conduit 128 will need to be reduced. While this can be accomplished by means of upstream and/or downstream valves (not shown), the housing 126 of the overpressure abatement assembly 104 has a bleeder valve 126A (see FIG. 1) on the housing 126 that communicates with the inner conduit 128. Once the fluid flow has been stopped and the pressure bled off, a workman can physically rotate the valve member 132 to its open position as shown in FIG. 2 by means of rotating the external handle 135; then, the workman can push the second piston 138 downwardly to set the locking pin 140 into blocking engagement with the projection 136.

A replacement collapsible member 142 is next installed to secure the second piston 138 in its down position, and fluid pressure is gradually increased through the interior conduits 108, 128 so that the over pressure abatement assembly 104 is returned to the ready configuration depicted in FIG. 2. As with the underpressure abatement assembly 102, electronic monitoring can be provided to supply an indication of the status of the over pressure abatement assembly 104.

In accordance with various embodiments, the apparatus of the present invention generally comprises an under pressure abatement assembly that generally operates to establish low pressure isolation of the fluid when the fluid pressure falls below a low pressure threshold value. The under pressure abatement assembly generally comprises a valve member which is moveable between an open and a closed position to respectively impede fluid flow or isolate fluid flow along a conduit path. A locking pin arrangement retains the valve member in an open position when the fluid pressure is above a predetermined threshold low pressure value.

A piston is coupled to the locking pin, and a collapsible member, such as a buckling pin, is coupled to the piston. The collapsible member is configured to be mechanically collapsed when the piston is advanced toward the collapsible member.

An energy storage member, such as a coiled spring, is adapted to exert a first force upon the piston in the first direction so that, when the pressure of the pressurized fluid falls below a predetermined low threshold value, the first force imparted by the energy storage member will be sufficient to advance the piston in the first direction to collapse the collapsible member.

A portion of the pressurized fluid is directed to apply a second force upon the piston in relation to the pressure of the pressurized fluid. This second force is in opposition to the first force. During normal system operation when the pressure of the pressurized fluid is above the low threshold value, the second force will exceed the first force of the energy storage member and the collapsible member will remain in an uncollapsed state. On the other hand, should the pressure of the pressurized fluid fall below the lower threshold value, the first force of the energy storage member will exceed the opposing second force exerted by fluid pressure on the piston, and the piston will be moved in the first direction to collapse the collapsible member.

The apparatus of the present invention can further comprise an over pressure abatement assembly that generally operates to establish high pressure isolation of the pressurized fluid when the fluid pressure increases above a predetermined upper pressure threshold value. The over pressure abatement assembly can be located upstream or downstream of the underpressure abatement assembly, and has been described herein with relation to the appended drawings as being downstream thereto.

The over pressure abatement assembly comprises a second valve member that is moveable between an open position and a closed position to respectively allow fluid flow along a conduit path or isolate the fluid flow. A second locking pin serves to retain the second valve member in the open position. A second piston is coupled to the second locking pin, and a second collapsible member, such as a buckling pin, is coupled to, and set in the travel path of, the second piston. The collapsible member is configured to collapse when the second piston advances toward the second collapsible member.

A portion of the pressurized fluid is directed to impart a collapsing force upon the second piston. During normal system operation, when the pressure of the pressurized fluid is below the upper high threshold pressure value, the strength of the second collapsible member will resist movement of the second piston, so that the second collapsible member will remain in its uncollapsed state. When the fluid pressure exceeds the upper threshold value, the collapsing force of the pressurized fluid on the second piston moves the second piston to collapse the second collapsible member, thereby retracting the locking pin and allowing the second valve member to be rotated by the weight of the second valve member and the fluid pressure to move the second valve member to a closed, fluid isolating position.

It will now be appreciated that the various embodiments as presented herein provide certain advantages over the prior art. Both underpressure and over pressure conditions can be detected and abated using highly precise buckling pins or other collapsible members. The system is reliable and easily manufactured and maintained. The underpressure abatement assembly can be used in a stand-alone fashion, or can be used in conjunction with the over pressure abatement assembly. Any number of different upper and lower threshold values can be selected in relation to the sizing and strength of the buckling pins.

For purposes herein, mechanical collapse will be understood as a permanent deformation of the collapsible member so that the member is altered to take a different shape. Mere displacement of the collapsible member, such as taught by Taylor U.S. Pat. No. 6,799,597, hereby incorporated by reference, does not constitute mechanical collapse as discussed herein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular environment without departing from the spirit and scope of the present invention.

What is claimed is:

1. A fluid control assembly configured to establish a low pressure isolation of a pressurized fluid when the pressure thereof falls below a low pressure threshold, comprising:
   an under pressure abatement assembly comprising:
     a collapsible member;
     energy storage means for exerting a first force in a selected direction to mechanically collapse the collapsible member; and a conduit path to direct a portion of the pressurized fluid to exert a second force in opposition to the first force:

wherein when the pressurized fluid is above the low pressure threshold, the second force will exceed the first force and the collapsible member will remain uncollapsed; and wherein when the pressurized fluid falls below the low pressure threshold, the first force will be greater than the second force and the collapsible member will be mechanically collapsed.

2. The fluid control assembly of claim 1, wherein the under pressure abatement assembly further comprises:

a valve member moveable between an open and a closed position to respectively allow fluid flow or isolate the fluid flow;

a locking pin; and a slidable piston coupled to the locking pin to retain the valve member in the open position and to release the valve member;

wherein the collapsible member is coupled to the piston and configured to collapse when the piston advances in a first direction toward the collapsible member; and wherein the energy storage means exerts the first force upon the piston in the first direction, and wherein the portion of the pressurized fluid exerts the second force upon the piston an opposing second direction.

3. The fluid control assembly of claim 1, further comprising:

an over pressure abatement assembly in fluid communication with the under pressure abatement assembly and configured for establishing high pressure isolation of the pressurized fluid when the pressure thereof exceeds an upper pressure value.

4. The fluid control assembly of claim 3, wherein the over pressure abatement assembly comprises:

a second collapsible member; and means for directing a portion of the pressurized fluid to exert a collapsing force upon the second collapsible member;

wherein when the pressurized fluid exceeds the upper pressure value, the collapsing force will collapse the second collapsible member; and wherein when the pressurized fluid is below the upper pressure value, the collapsing force will be insufficient to collapse the second collapsible member.

5. The fluid control assembly of claim 4, wherein the over pressure abatement assembly further comprises:

a second valve member moveable between an open position and a closed position to respectively allow or isolate fluid flow;

a second locking pin selectively retaining or releasing the second valve member; and a second piston coupled to the second locking pin;

wherein the second collapsible member is coupled to the second piston and configured to collapse when the second piston advances toward the second collapsible member; and wherein the pressurized fluid exerts the third force upon the second piston.

6. The fluid control assembly of claim 1, wherein the collapsible member comprises a buckling pin that, when collapsed, is bent in three locations along an axial length thereof.

7. The fluid control assembly of claim 1, wherein the energy storage means comprises a coiled spring that exerts the first force upon the piston connected to the collapsible member.

8. The fluid control assembly of claim 4, wherein the second locking pin is an elongated projection tube extending from the second piston, and wherein the second conduit path extends through the elongated projection tube along an axial length thereof.

9. A fluid control assembly configured to isolate a pressurized fluid when the pressure thereof falls below a low pressure threshold, comprising:

an under pressure abatement assembly comprising:

a collapsible member;

a pivotal valve member;

means for exerting a collapsing force on the collapsible member and for securing or releasing the valve member in an open position; and means to direct the pressurized fluid to exert an opposing force in opposition to the collapsing force; and wherein when the pressurized fluid falls below the low pressure threshold, the collapsing force will be greater than the opposing force to collapse the collapsible member and the valve member will be pivoted to a closed position.

10. The fluid control assembly of claim 9, wherein the valve member is moveable between the open and closed positions to respectively allow fluid flow along a conduit path or isolate fluid flow, and wherein the means for exerting the collapsing force comprises:

a locking pin selectively retaining the valve member in the open position; and a piston coupled to the locking pin and to the collapsible member so that the collapsible member will collapse when the piston is advanced in a first direction toward the collapsible member; and wherein the means for exerting the collapsing force exerts the collapsing force upon the piston in the first direction, and wherein the opposing force opposes the collapsing force.

11. The fluid control assembly of claim 9, further comprising:

an over pressure abatement assembly in fluid communication with the under pressure abatement assembly and configured for establishing high pressure isolation of the pressurized fluid when the pressure thereof exceeds a predetermined upper pressure value.

12. The fluid control assembly of claim 11, wherein the over pressure abatement assembly comprises:

a second collapsible member;

a second valve member;

means for selectively securing the second valve member in an open position; and means for directing a portion of the pressurized fluid to exert a collapsing force on the second collapsible member when the fluid pressure exceeds the predetermined upper pressure value, the means for securing the second valve member releasing the second valve member when the fluid pressure exceeds the predetermined upper pressure value.

13. The fluid control assembly of claim 12, wherein the means for securing the second valve means comprises:

a second locking pin selectively retaining or releasing the second valve member in the open position; and a second piston coupled to the second locking pin and to the second collapsible member so that the second collapsible member will be collapsed when the second piston is advanced toward the second collapsible member by the force of the fluid pressure when exceeding the upper pressure value.

14. The fluid control assembly of claim 9, wherein the collapsible member comprises a buckling pin that, when collapsed, is bent in three locations along an axial length thereof.

15. The fluid control assembly of claim 9, wherein the means for exerting the collapsing force comprises a coiled spring that exerts the collapsing force on the collapsible member.

16. The fluid control assembly of claim 12, wherein the second collapsible member comprises a buckling pin that, when collapsed, is bent in three locations along an axial length thereof.

17. The fluid control assembly of claim 13, wherein the second locking pin is an elongated member extending from the second piston.

18. A fluid control assembly, comprising:
 a normally open valve member moveable between an open position to allow a flow of pressurized fluid along a conduit and a closed position to impede said flow of pressurized fluid;
 a piston coupled to the valve member and slidable between a first extent to retain the valve member in the open position and a second extent to release the valve member and facilitate transition of the valve member to the closed position;
 a biasing member which urges the piston in a direction toward the second extent; and
 a collapsible member coupled to the piston and configured to mechanically collapse responsive to advancement of the piston to the second extent responsive to a reduction in a pressure of the fluid.

19. The fluid control assembly of claim 18, in which the piston comprises opposing upper and lower surfaces, the biasing member exerting a biasing force upon the lower surface, the piston further comprising a hollow tube extension which defines an interior passageway to direct a portion of the pressurized fluid to exert a retention force upon the upper surface.

20. The fluid control assembly of claim 19, in which a distal end of the hollow tube extension engages the valve member to retain the valve member in the open position, and said reduction in the pressure of the fluid facilitates advancement of the piston to the second extent by the biasing force from the biasing member, thereby disengaging the hollow tube extension from the valve member.

* * * * *